United States Patent
Aoki et al.

(10) Patent No.: US 7,490,685 B2
(45) Date of Patent: Feb. 17, 2009

(54) HYBRID VEHICLE

(75) Inventors: Takashi Aoki, Saitama (JP); Tetsu Sugiyama, Saitama (JP); Nobuhiro Kira, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 463 days.

(21) Appl. No.: 10/527,436

(22) PCT Filed: Jul. 14, 2003

(86) PCT No.: PCT/JP03/08892

§ 371 (c)(1),
(2), (4) Date: Oct. 14, 2005

(87) PCT Pub. No.: WO2004/024486

PCT Pub. Date: Mar. 25, 2004

(65) Prior Publication Data

US 2006/0137920 A1 Jun. 29, 2006

(30) Foreign Application Priority Data

Sep. 13, 2002 (JP) ............................ 2002-268400

(51) Int. Cl.
*B60K 6/20* (2007.10)

(52) U.S. Cl. .................... 180/65.2; 180/65.3; 903/948; 477/5

(58) Field of Classification Search ............... 180/65.2, 180/65.3, 65.5; 903/906, 909, 942, 945, 903/948; 477/5, 39, 84, 167
See application file for complete search history.

(56) References Cited

U.S. PATENT DOCUMENTS 6,269,895 B1 8/2001 Tanuguchi et al.
6,346,062 B1 * 2/2002 Shimabukuro et al. ......... 477/5
6,463,375 B2 * 10/2002 Matsubara et al. ........... 701/54
6,656,083 B2 * 12/2003 Esaki ........................... 477/5
6,716,138 B2 * 4/2004 Matsubara et al. .......... 477/167

FOREIGN PATENT DOCUMENTS

| EP | 1 116 619 A2 | 7/2001 |
| EP | 1 232 894 A2 | 8/2002 |
| JP | 2001-171376 A | 6/2001 |
| JP | 2001-200920 A | 7/2001 |

\* cited by examiner

*Primary Examiner*—Christopher Ellis
*Assistant Examiner*—John D Walters
(74) *Attorney, Agent, or Firm*—Arent Fox LLP (57) ABSTRACT

A hybrid vehicle is provided that can be made to travel by means of motor generators (MG1, MG2) while an engine (E) is stopped, the engine (E), which can reduce pumping loss by running with a cylinder in a cut-off state, being connected to a front wheel (Wf) via the first motor/generator (MG1), an oil pump (13), a first clutch (14), a belt type continuously variable transmission (M), and a second clutch (20), and the second motor/generator (MG2) being connected to a rear wheel (Wr). When the vehicle is made to travel by driving or braking the rear wheel (Wr) with the second motor/generator (MG2), by driving the oil pump (13) with the first motor/generator (MG1) in a state in which the engine (E), which has stopped running, is put into a cylinder cut-off state and the second clutch (20) is disengaged, a hydraulic pressure for shifting the belt type continuously variable transmission (M) is generated. It is thereby possible to generate a hydraulic pressure for shifting the belt type continuously variable transmission (M) while the engine (E) is stopped, without requiring a special electric oil pump.

6 Claims, 13 Drawing Sheets

HYBRID VEHICLE

CROSS-REFERENCE TO RELATED APPLICATION

This application is a National Stage entry of International Application No. PCT/JP03/08892, filed Jul. 14, 2003, the entire specification claims and drawings of which are incorporated herewith by reference.

FIELD OF THE INVENTION

The present invention relates to a hybrid vehicle in which an engine equipped with pumping loss reduction means is connected to a first driven wheel via a first motor/generator, an oil pump, a first clutch, a hydraulic automatic transmission, and a second clutch, and a second motor/generator is connected to a second driven wheel.

BACKGROUND ART

A hybrid vehicle in which a first motor/generator, an oil pump, a first clutch, a belt type continuously variable transmission, a second clutch, and a second motor/generator are disposed between an engine and a driven wheel is known from Japanese Patent Application Laid-open No. 2001-200920. This conventional hybrid vehicle starts off and accelerates by means of the driving force of the engine, and the driving force of the engine is assisted by making the first motor/generator function as a motor; during cruising, the engine is stopped, and the vehicle travels by making the second motor/generator function as a motor; and during deceleration, electrical energy is recovered by making the first and second motor/generators function as generators.

When the engine is running, it is possible to generate a hydraulic pressure for shifting the belt type continuously variable transmission with the oil pump, which is driven by the engine, but when the engine is stopped and the vehicle travels by means of the driving force of the second motor/generator, since the oil pump generates no hydraulic pressure, when switching from traveling by means of the driving force of the second motor/generator to traveling by means of the driving force of the engine, there is a time lag until the oil pump generates a hydraulic pressure and shifting of the belt type continuously variable transmission becomes possible, and there is a possibility that the ratio control responsiveness might be degraded thus causing shift shock to occur.

In the above-mentioned conventional arrangement, in addition to the oil pump driven by the engine, an electric oil pump is provided, and by generating a hydraulic pressure with the electric hydraulic pump when the engine is stopped, the actual ratio of the belt type continuously variable transmission is rapidly made to coincide with a target ratio when switching over from traveling by means of the driving force of the second motor/generator to traveling by means of the driving force of the engine,.

However, in the above-mentioned conventional arrangement, since it is necessary to employ an electric oil pump in addition to the oil pump driven by the engine, there is the problem that the number of components, cost, space, weight, etc. are increased by an amount corresponding to the electric oil pump and a motor for driving it.

DISCLOSURE OF INVENTION

The present invention has been accomplished under the above-mentioned circumstances, and it is an object thereof to provide a hybrid vehicle that can travel by means of a motor/generator while an engine is stopped, and that enables hydraulic pressure for shifting an automatic transmission to be generated when the engine is stopped, without requiring a special electric oil pump.

In order to attain this object, in accordance with a first aspect of the present invention, there is proposed a hybrid vehicle in which an engine equipped with pumping loss reduction means is connected to a first driven wheel via a first motor/generator, an oil pump, a first clutch, a hydraulic automatic transmission, and a second clutch, and a second motor/generator is connected to a second driven wheel, the second driven wheel being different from the first driven wheel, characterized in that when the vehicle is made to travel by driving or braking the second driven wheel with the second motor/generator, in order to shift the automatic transmission a hydraulic pressure is generated by driving the oil pump with the first motor/generator in a state in which the pumping loss of the engine, which has stopped running, is reduced by the pumping loss reduction means and the second clutch is disengaged.

In accordance with this arrangement, when the vehicle is made to travel by driving or braking the second driven wheel with the second motor/generator while operation of the engine is stopped, since the oil pump is driven by the first motor/generator while the pumping loss of the engine is reduced by the pumping loss reduction means and the second clutch is disengaged, not only is it possible to shift the automatic transmission with the hydraulic pressure generated by the existing oil pump without providing a special electric oil pump, but it is also possible to prevent shift shock from occurring by controlling the actual ratio of the automatic transmission at a target ratio with good responsiveness when the engine is started and the first driven wheel is driven via the automatic transmission. Moreover, since the engine rotated by the first motor/generator is in a state in which the pumping loss is reduced, and the first motor/generator is disconnected from the first driven wheel by the second clutch being disengaged, not only is it possible to minimize the power consumption of the first motor/generator, but it is also possible to start the engine rapidly by controlling the ignition and starting the supply of fuel.

Furthermore, in accordance with a second aspect of the present invention, in addition to the first aspect, there is proposed the hybrid vehicle wherein, when a deviation of the actual ratio of the automatic transmission from a target rate exceeds a predetermined value, the automatic transmission is shifted while intermittently engaging the first clutch.

In accordance with this arrangement, since the automatic transmission is shifted by intermittently engaging the first clutch when the deviation of the actual ratio from the target ratio exceeds the predetermined value, compared with a case in which shifting is carried out by continuously engaging the first clutch it is possible to reduce the power consumption by minimizing the time for which the automatic transmission is driven by the first motor/generator.

Moreover, in accordance with a third aspect of the present invention, in addition to the first aspect, there is proposed the hybrid vehicle wherein, when the percentage change of a target ratio of the automatic transmission exceeds a predetermined value, the automatic transmission is shifted while continuously engaging the first clutch.

In accordance with this arrangement, since the automatic transmission is shifted while continuously engaging the first clutch when the percentage change of the target ratio of the automatic transmission exceeds the predetermined value, shifting can be carried out without delay when rapid shifting is necessary.

Furthermore, in accordance with a fourth aspect of the present invention, in addition to the first aspect, there is proposed the hybrid vehicle wherein, when the remaining capacity of a battery connected to the first and second motor/generators exceeds a predetermined value, the required driving force of the vehicle is less than a predetermined value, and the pumping loss of the engine can be reduced, traveling by means of the second motor/generator is permitted.

In accordance with this arrangement, since traveling by means of the second motor/generator is permitted when the remaining capacity of the battery is sufficient, the remaining capacity of the battery does not become insufficient; since traveling by means of the second motor/generator is permitted when the required driving force of the vehicle is small, the driving force of the vehicle does not become insufficient; and since traveling by means of the second motor/generator is permitted when the pumping loss of the engine can be reduced, it is possible to minimize the power consumption of the first motor/generator for driving the oil pump and the engine.

Moreover, in accordance with a fifth aspect of the present invention, in addition to the fourth aspect, there is proposed the hybrid vehicle wherein, when the pumping loss reduction means is operated and traveling is carried out by means of the second motor/generator, a hydraulic pressure for shifting the automatic transmission is generated by driving the oil pump with the first motor/generator.

In accordance with this arrangement, since the hydraulic pressure for shifting the automatic transmission is generated by driving the oil pump with the first motor/generator when traveling is carried out by means of the second motor/generator in a state in which the pumping loss of the engine is reduced, it is possible to rapidly shift the automatic transmission in readiness for traveling by means of the engine while minimizing the power consumption of the first motor/generator.

Furthermore, in accordance with a sixth aspect of the present invention, in addition to the first aspect, there is proposed the hybrid vehicle wherein, when a hydraulic pressure is generated in order to shift the automatic transmission by driving the oil pump with the first motor/generator, the first clutch is disengaged.

In accordance with this arrangement, since the first clutch is disengaged when the oil pump is driven by the first motor/generator, it is possible to prevent drag on the automatic transmission from the driving force of the first motor/generator, thus reducing the power consumption.

A belt type continuously variable transmission M of an embodiment corresponds to the automatic transmission of the present invention, a front motor/generator MG1 and a rear motor/generator MG2 of the embodiment correspond to the first motor/generator and the second motor/generator respectively of the present invention, and front wheels Wf and rear wheels Wr of the embodiment correspond to the first driven wheel and the second driven wheel of the present invention.

BRIEF DESCRIPTION OF DRAWINGS

FIG. 1 to FIG. 13 illustrate one embodiment of the present invention;

BEST MODE FOR CARRYING OUT THE INVENTION

An embodiment of the present invention is explained below with reference to the attached drawings.

Figure 1:
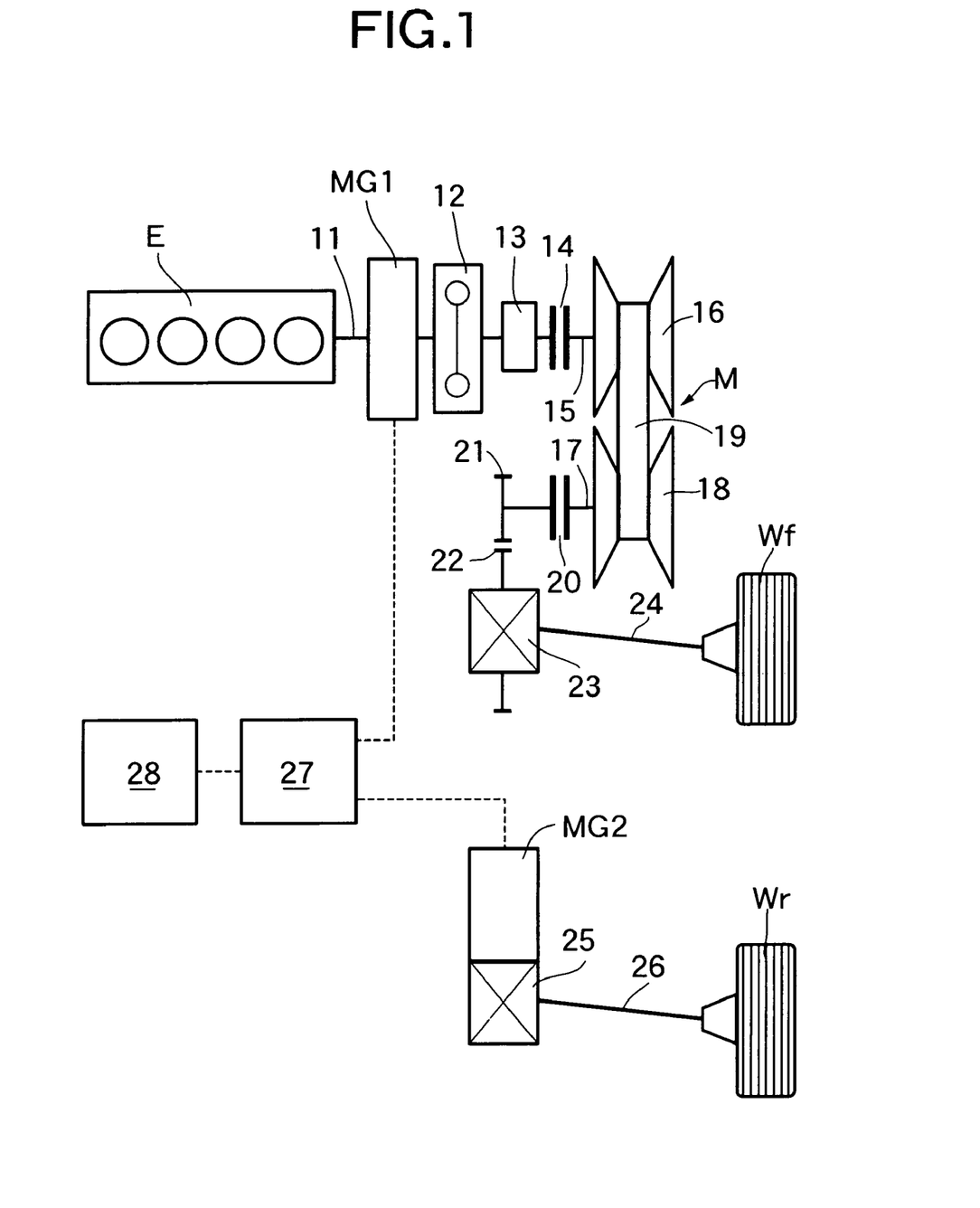
FIG. 1 is a diagram of the overall arrangement of a power transmission system of a hybrid vehicle.

As shown in FIG. 1, connected in series to a crankshaft 11 of an engine E that can put all cylinders in a cut-off state are a front motor/generator MG1, a damper 12, an oil pump 13, a first clutch 14, and an input shaft 15 of a belt type continuously variable transmission M. An endless belt 19 is wound around a drive pulley 16 provided on the input shaft 15 and a driven pulley 18 provided on a transmission output shaft 17. The damper 12 has the functions of suppressing torque shock when a sudden torque is transmitted from the engine E and suppressing the amplitude of torsional vibration of the crankshaft 11. The transmission output shaft 17 is connected to left and right front wheels Wf via a second clutch 20, a final drive gear 21, a final driven gear 22, a front differential gear 23, and left and right axles 24. A rear motor/generator MG2 is connected to left and right rear wheels Wr via a rear differential gear 25 and left and right axles 26.

The front and rear motor/generators MG1 and MG2 are connected to a battery 28 via a power drive unit 27.

During normal operation, an intake valve of the engine E is controlled so as to open and close in association with rotation of the crankshaft, but when running with the cylinders in a cut-off state, in order to reduce the pumping loss of the engine E, the intake valve is kept closed by pumping loss reduction means. Therefore, when the crankshaft 11 of the engine E is rotated by the front motor/generator MG1 while the cylinders of the engine E are in a cut-off state, the driving load can be minimized.

Although not specifically illustrated in this embodiment, the engine E, the belt type continuously variable transmission M, the front motor/generator MG1, the rear motor/generator MG2, and the battery 28 are controlled by corresponding ECUs (electronic control units), and there is also provided an integrating ECU for integrating these ECUs. Control in the flow charts of FIG. 2 to FIG. 13 described below is carried out by the integrating ECU.

Figure 2:
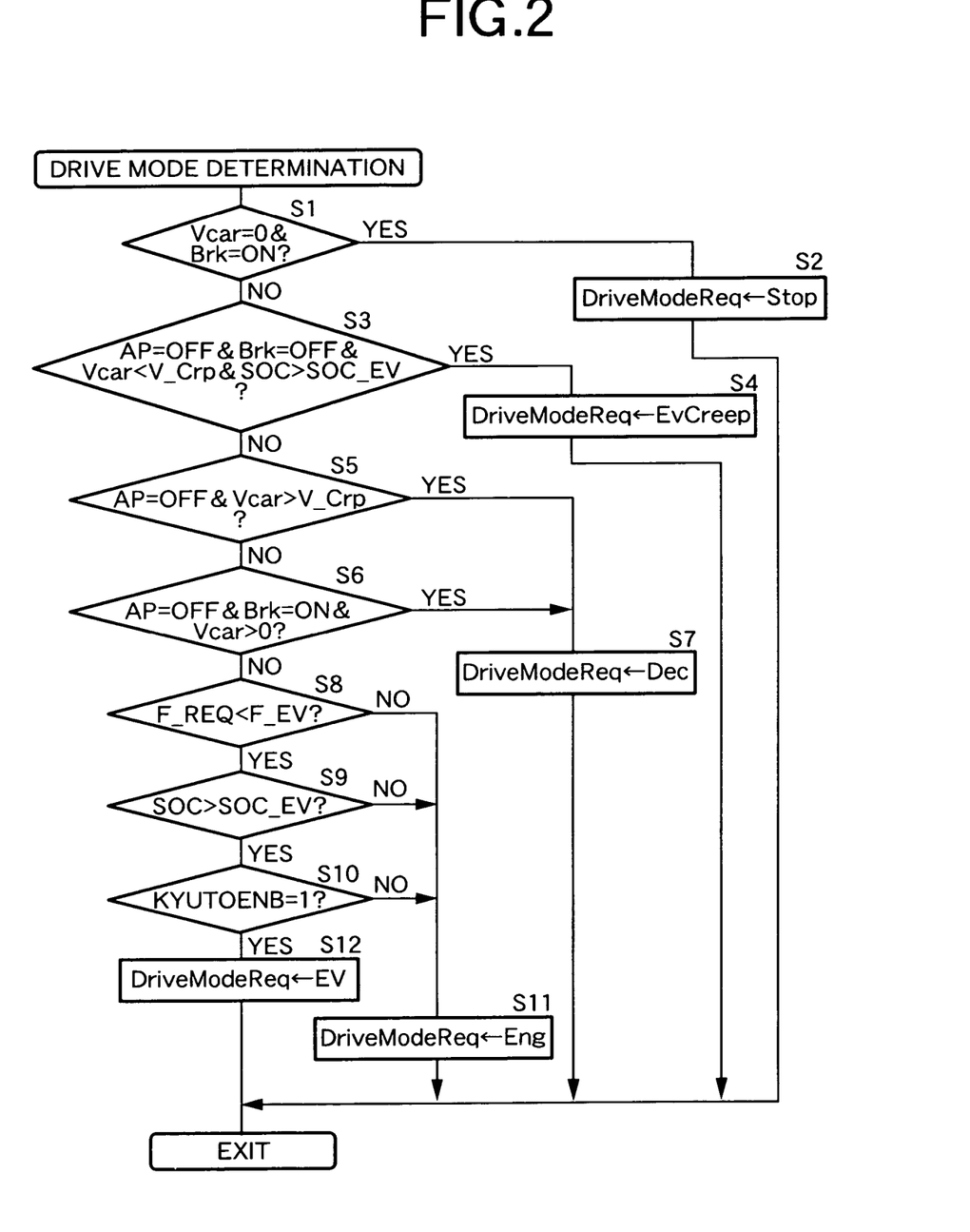
FIG. 2 is a flow chart of a drive mode determination routine.

With regard to the drive mode of a hybrid vehicle, there are five modes, that is, a 'stop mode', an 'electric creep mode', a 'deceleration mode', an 'engine mode', and an 'electric mode', and the mode is determined by the flow chart of a drive mode determination routine of FIG. 2.

That is, if in step S1 a vehicle speed Vcar is 0 and a brake switch Brk is ON, then in step S2 it is determined that a requested drive mode DriveModeReq is the 'stop mode'.

When the answer in step S1 is NO, then if in step S3 an accelerator pedal degree of opening AP is fully closed, the brake switch Brk is OFF, the vehicle speed Vcar is less than a creep determination vehicle speed V_Crp, and a remaining battery capacity SOC exceeds a permitted electric travel remaining capacity SOC_EV, then in step S4 it is determined that the requested drive mode DriveModeReq is the 'electric creep mode'. The 'electric creep mode' is a travel mode in which the vehicle is made to creep by means of the driving force of the second motor/generator MG2.

When the answer in step S3 is NO, then if in step S5 the accelerator pedal degree of opening AP is fully closed and the vehicle speed Vcar exceeds the creep determination vehicle speed V_Crp, or if in step S6 the accelerator pedal degree of opening AP is fully closed, the brake switch Brk is ON, and the vehicle speed Vcar is not 0, then in step S7 it is determined that the requested drive mode DriveModeReq is the 'deceleration mode'.

When the answers in steps S5 and S6 are both NO, if in step S8 a required driving force F_REQ is not less than a permitted electric travel driving force F_EV, or if in step S9 the remaining battery capacity SOC does not exceed the permitted electric travel remaining capacity SOC_EV, or if in step S10 a cylinder cut-off permission flag KYUTOENB is not equal to 1 (cylinder cut-off permission), then in step S11 it is determined that the requested drive mode DriveModeReq is the 'engine mode'. If the answers in steps S8 to S10 are all YES, then in step S12 it is determined that the requested drive mode DriveModeReq is the 'electric mode'. The 'electric mode' is a mode in which the vehicle is made to travel by the driving force of the second motor/generator MG2.

Since traveling by means of the second motor/generator MG2 is permitted when the required driving force F_REQ is small in step S8, the driving force for the vehicle does not become insufficient. Since traveling by means of the second motor/generator MG2 is also permitted when the remaining capacity of the battery 28 is sufficient in step S9, the capacity of the battery 28 does not become insufficient. Since traveling by means of the second motor/generator MG2 is also permitted when the engine E can be in a cylinder cut-off state in step S10, it is possible to minimize the power consumption of the first motor/generator MG1, which rotates the engine E in a cylinder cut-off state together with the oil pump 13.

A mode transition processing routine is now explained with reference to the flow chart of FIG. 3.

Firstly, in step S21, when a current drive mode DriveMode coincides with the requested drive mode DriveModeReq, then if in step S22 the drive mode DriveMode is the 'stop mode', then in step S23 stop mode processing is carried out, if in step S24 the drive mode DriveMode is the 'electric creep mode', then in step S25 electric creep mode processing is carried out, if in step S26 the drive mode DriveMode is the 'deceleration mode', then in step S27 deceleration mode processing is carried out, if in step S28 the drive mode DriveMode is the 'engine mode', then in step S29 engine mode processing is carried out, and if in step S30 the drive mode DriveMode is the 'electric mode', then in step S31 electric mode processing is carried out.

On the other hand, when the current drive mode DriveMode does not coincide with the requested drive mode DriveModeReq in step S21, if in step S32 the requested drive mode DriveModeReq is the 'stop mode', then in step S33 stop mode transition processing is carried out, if in step S34 the requested drive mode DriveModeReq is the 'electric creep mode', then in step S35 electric creep mode transition processing is carried out, if in step S36 the requested drive mode DriveModeReq is the 'deceleration mode', then in step S37 deceleration mode transition processing is carried out, if in step S38 the requested drive mode DriveModeReq is the 'engine mode', then in step S39 engine mode transition processing is carried out, and if in step S40 the requested drive mode DriveModeReq is the 'electric mode', then in step S41 electric mode transition processing is carried out.

Figure 3:
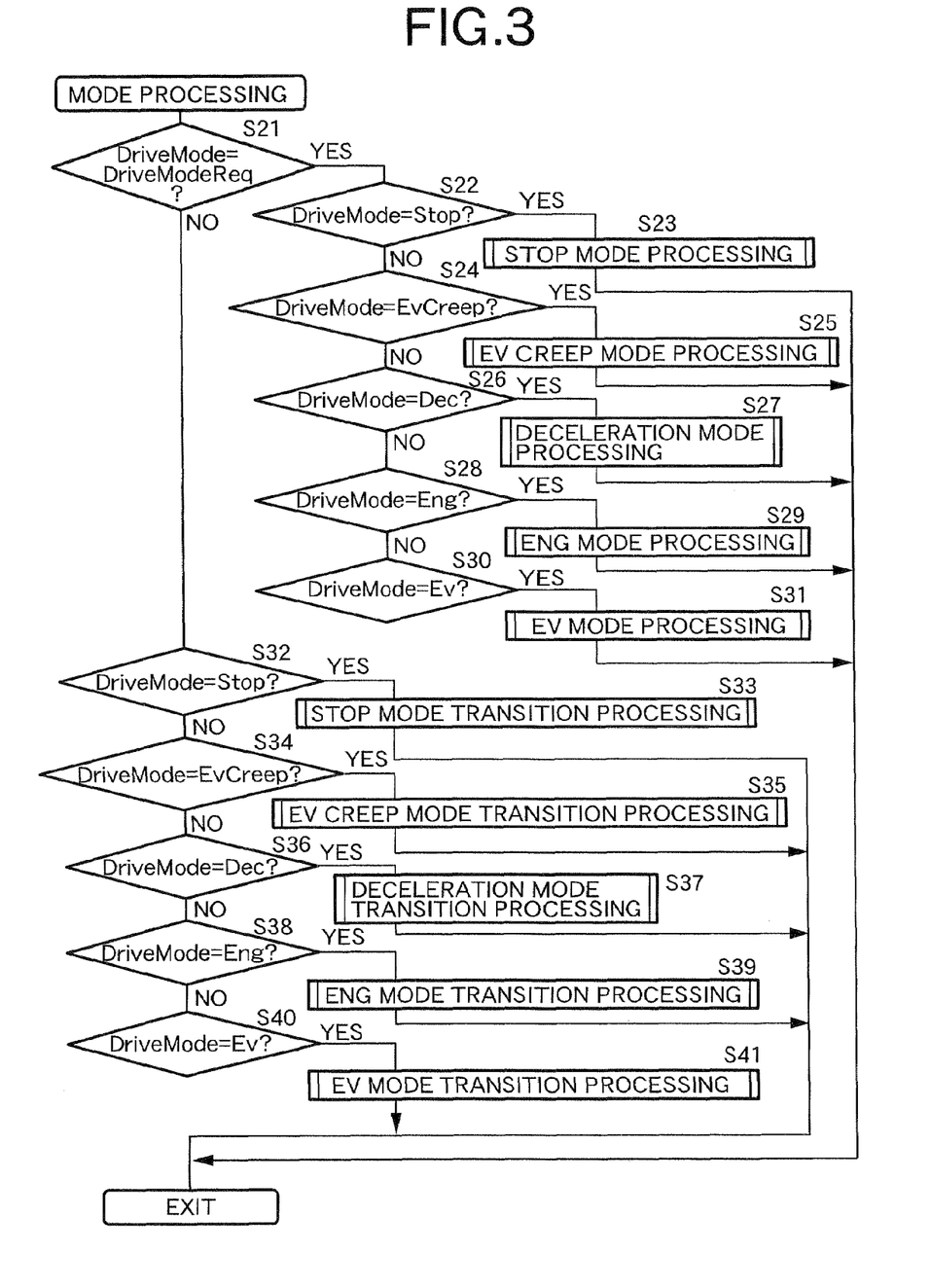
FIG. 3 is a flow chart of a mode transition processing routine.
Figure 4:
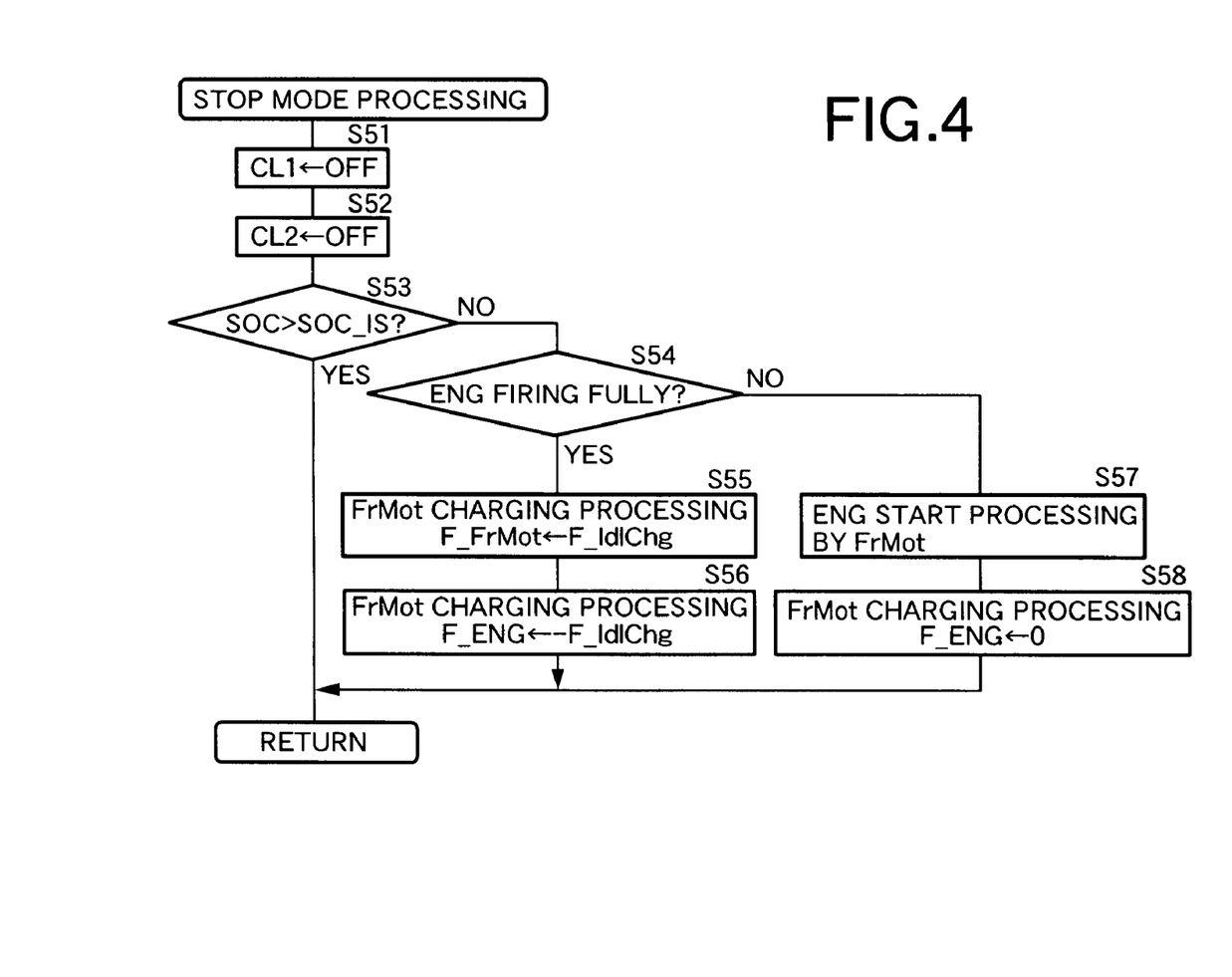
FIG. 4 is a flow chart of a stop mode processing routine.

A subroutine of the 'stop mode processing' of step S23 of the flow chart of FIG. 3 is now explained with reference to the flow chart of FIG. 4.

Firstly, in step S51 the first clutch 14 is disengaged, and in step S52 the second clutch 20 is disengaged. In the subsequent step S53, when the remaining battery capacity SOC is not greater than a permitted idle stop capacity SOC_IS (the remaining capacity that enables the engine E to be restarted even if it is put in an idle stop state), that is, when the remaining battery capacity SOC is insufficient, if in step S54 the engine E is firing fully, then in step S55 in order to carry out charging with the front motor/generator MG1, a front motor/generator drive command F_FrMot is set at an idle charge command F_IdlChg (negative value), and in step S56 an engine drive command F_ENG is set at the idle charge command F_IdlChg (positive value). By so doing, while running the engine E the front motor/generator MG1 is made to function as a generator, thus charging the battery 28.

In step S54, if the engine E is not firing fully, in step S57 the front motor/generator MG1 is made to function as a motor so as to crank the engine E, and in step S58 the engine drive command F_ENG is set at 0 (no load throttle degree of opening), thus starting the engine E.

A subroutine of the 'electric creep mode processing' of step S25 of the flow chart of FIG. 3 is now explained with reference to the flow chart of FIG. 5.

Firstly, in step S71 the second clutch 20 is disengaged, and in step S72 driving the front motor/generator MG1 as a motor and idling the engine E in a cylinder cut-off state allows the oil pump 13 to be driven while minimizing the pumping loss of the engine E, thus generating a hydraulic pressure for shifting the belt type continuously variable transmission M. In the subsequent step S73, the driving force command for the rear motor/generator MG2 is set at a required driving force F_REQ, and the rear motor/generator MG2 is made to function as a motor, thus making the vehicle creep electrically.

In the subsequent step S74, a target ratio RatioObj of the belt type continuously variable transmission M is calculated from the accelerator pedal degree of opening AP and the vehicle speed Vcar, or the required driving force F_REQ and the vehicle speed Vcar. In step S75, when a percentage target ratio change |ΔRatioObj| exceeds a predetermined value, that is, the percentage target ratio change |ΔRatioObj| is large, then in step S76 the first clutch 14 is engaged, and in step S77 shift processing is carried out so that the actual ratio Ratio of the belt type continuously variable transmission M coincides with the target ratio RatioObj. The hydraulic pressure required in this process employs a hydraulic pressure that is generated by the oil pump 13 by driving the engine E in the cylinder cut-off state with the front motor/generator MG1. In step S78, a ratio check timer TmRatioChk (down count timer) is set at a predetermined time TRATIOCHK.

As a result of the shift processing being carried out in step S77, in step S75 even if the percentage target ratio change |ΔRatioObj| does not exceed the predetermined value, if in the subsequent step S79 the ratio check timer TmRatioChk has timed up, then in step S80 the first clutch 14 is engaged. If in step S81 a deviation |RatioObj−Ratio| of the actual ratio Ratio from the target ratio RatioObj is not less than a predetermined value, that is, the deviation |RatioObj−Ratio| is large, then in step S82 shift processing is carried out so that the actual ratio Ratio of the belt type continuously variable transmission M coincides with the target ratio RatioObj. The hydraulic pressure required in this process employs a hydraulic pressure that is generated by the oil pump 13 by driving the engine E in the cylinder cut-off state with the front motor/generator MG1. On the other hand, if in step S81 the deviation |RatioObj−Ratio| is less than the predetermined value, then in step S78 the ratio check timer TmRatioChk is set at the predetermined time TRATIOCHK. If in the step S79 the ratio check timer TmRatioChk has not timed up, then in step S83 the first clutch 14 is disengaged.

In this way, if the percentage target ratio change |ΔRatioObj| exceeds the predetermined value when the engine E is in the cylinder cut-off state, then the first clutch 14 is engaged so as to drive the oil pump 13, the actual ratio Ratio of the belt type continuously variable transmission M is controlled at the target ratio RatioObj by the hydraulic pressure generated by the oil pump 13, each time the predetermined time TRATIOCHK elapses the first clutch 14 is engaged to drive the oil pump 13, and in this process if the deviation |RatioObj−Ratio| of the actual ratio Ratio from the target ratio RatioObj is not less than the predetermined value, then the actual ratio Ratio of the belt type continuously variable transmission M is controlled at the target ratio RatioObj, thereby enabling delay in response of shifting of the belt type continuously variable transmission M to be prevented.

A subroutine of the 'deceleration mode processing' of step S27 of the flow chart of FIG. 3 is now explained with reference to the flow chart of FIG. 6.

Figure 5:
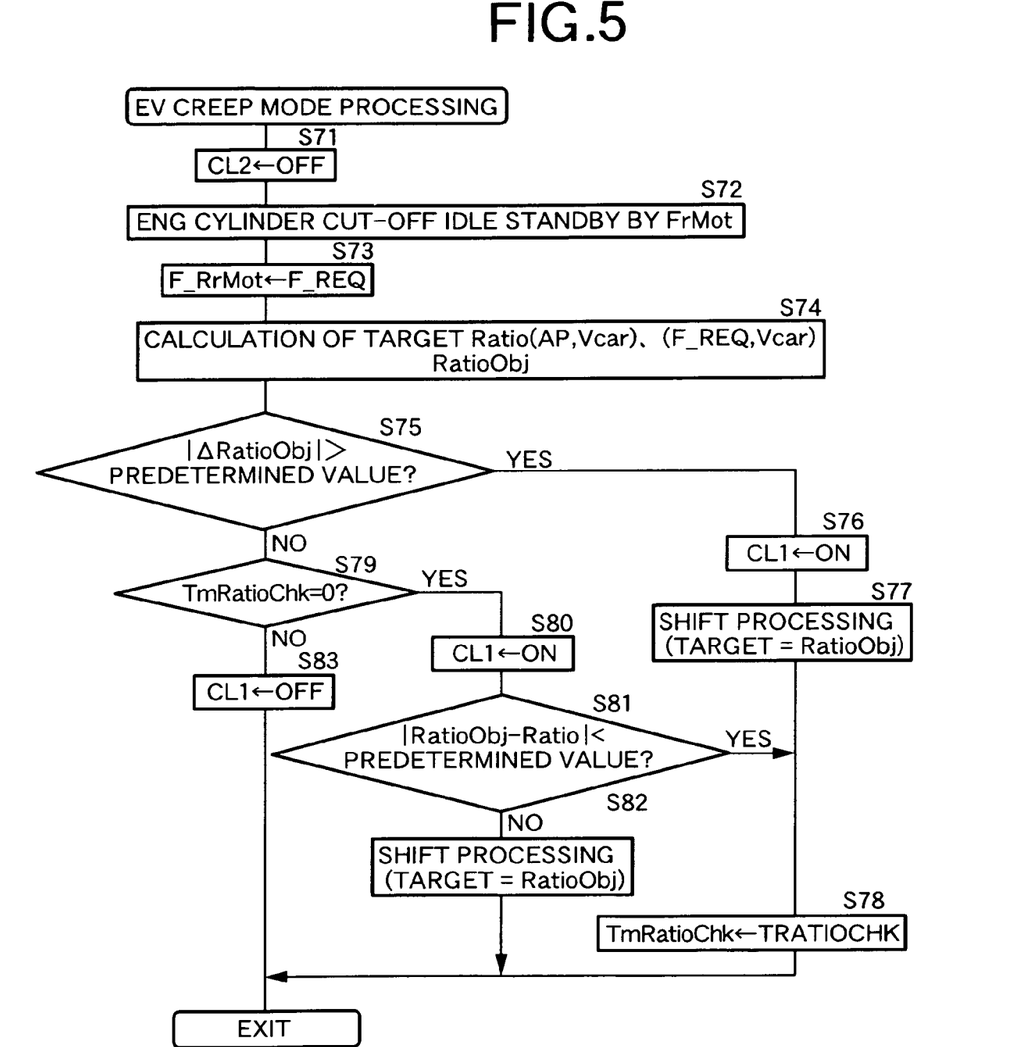
FIG. 5 is a flow chart of an electric creep mode processing routine.
Figure 6:
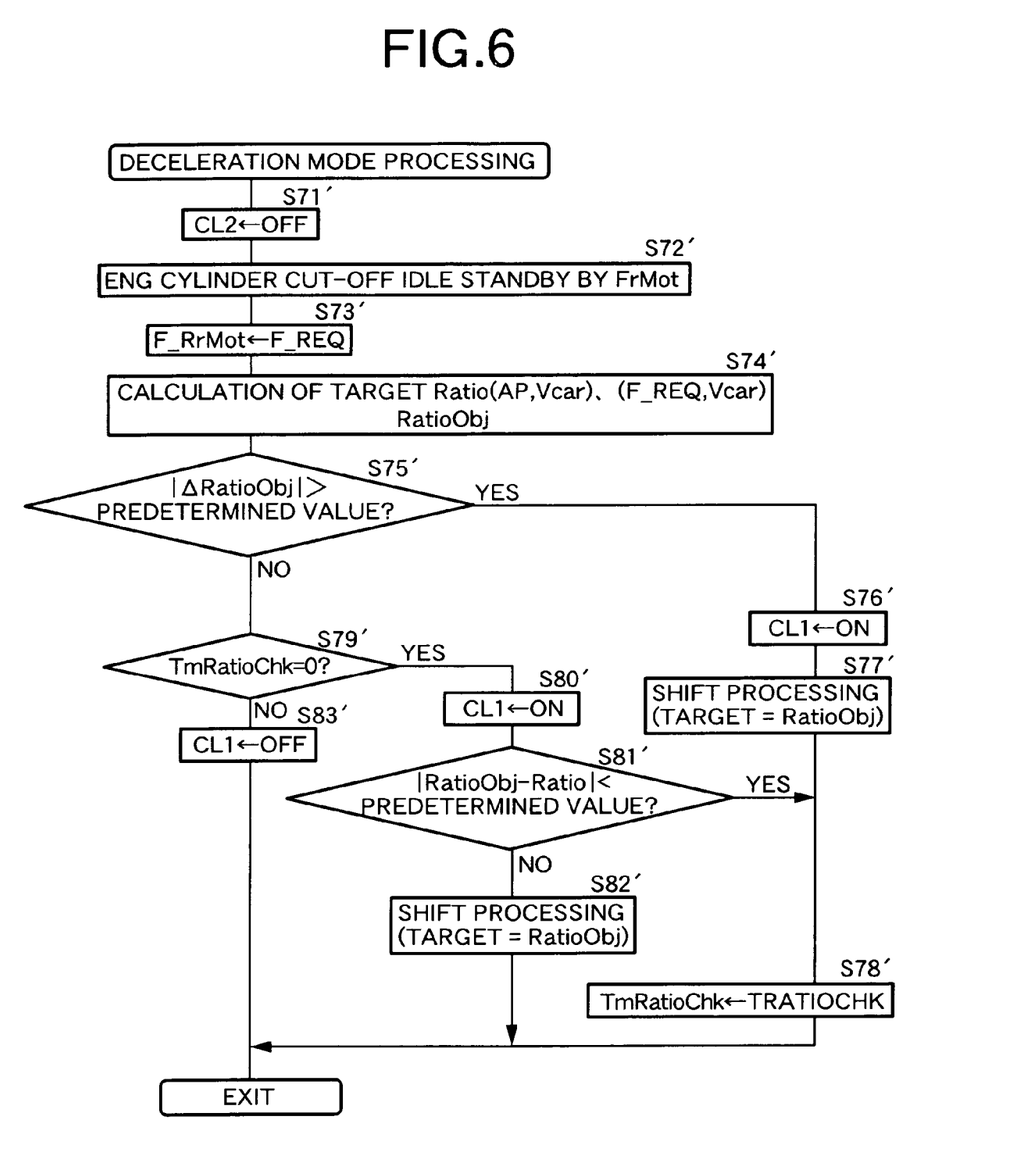
FIG. 6 is a flow chart of a deceleration mode processing routine.

The flow chart of FIG. 6 is substantially the same as that of FIG. 5; when the vehicle is decelerated, in the same manner as when the vehicle is made to creep electrically, the first clutch 14 is engaged under predetermined conditions so as to rotate the drive pulley 16 and the driven pulley 18 of the belt type continuously variable transmission M, and shifting to the target ratio RatioObj is carried out while checking the actual ratio Ratio; it is therefore possible to reliably prevent a delay in response of shifting of the belt type continuously variable transmission M. The only difference is that, in step S73 of the flow chart of FIG. 5 the rear motor/generator driving force command F_RrMot is set at the required driving force F_REQ, and the rear motor/generator MG2 is made to function as a motor so as to make the vehicle creep electrically, but in step S73' of the flow chart of FIG. 6 the rear motor/generator driving force command F_RrMot is set at the required driving force F_REQ (regenerative braking), and the rear motor/generator MG2 is made to function as a generator so as to generate a regenerative braking force, thus recovering the kinetic energy of the vehicle as electrical energy in the battery 28.

Figure 7:
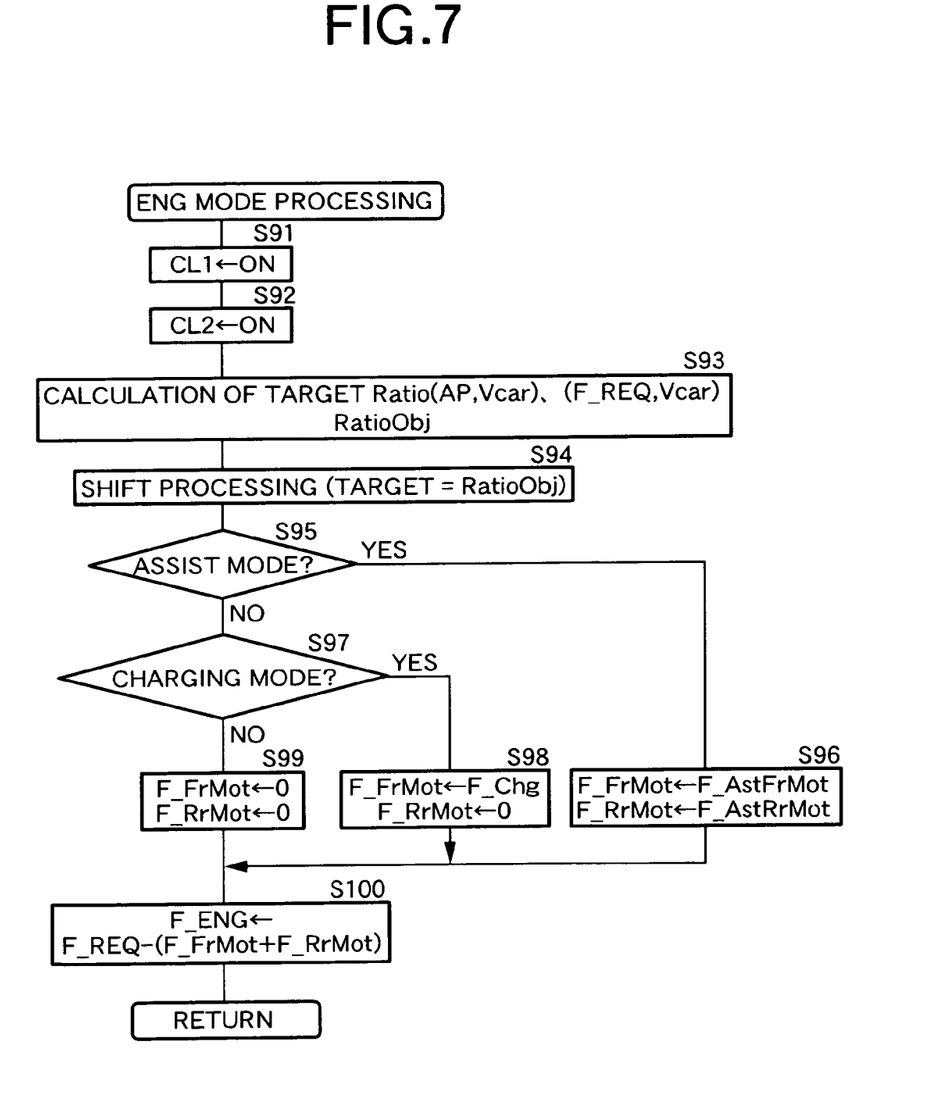
FIG. 7 is a flow chart of an engine mode processing routine.

A subroutine of the 'engine mode processing' of step S29 of the flow chart of FIG. 3 is now explained with reference to the flow chart of FIG. 7.

Firstly, in step S91 the first clutch 14 is engaged (including the so-called half-clutch control), in step S92 the second clutch 20 is engaged, and in step S93 the target ratio RatioObj of the belt type continuously variable transmission M is calculated from the accelerator pedal degree of opening AP and the vehicle speed Vcar, or from the required driving force F_REQ and the vehicle speed Vcar. In step S94, shift processing is carried out so that the actual ratio Ratio of the belt type continuously variable transmission M coincides with the target ratio RatioObj.

In the subsequent step S95, if the mode is an assist mode, then in step S96 the front motor/generator driving force command F_FrMot is set at the front required assist driving force F_AstFrMot, the rear motor/generator driving force command F_RrMot is set at the rear required assist driving force F_AstRrMot, and the front motor/generator MG1 and the rear motor/generator MG2 are driven as motors, thus assisting the driving force of the engine E. In step S97, if the mode is a charging mode, in step S98 the front motor/generator driving force command F_FrMot is set at a charging driving force F_Chg, the rear motor/generator driving force command F_RrMot is set at 0, and the front motor/generator MG1 is driven as a generator, thus charging the battery 28. In steps S95 and S97, if the mode is neither the assist mode or the charging mode, in step S99 both the front motor/generator driving force command F_FrMot and the rear motor/generator driving force command F_RrMot are set at 0, thus running only the engine E.

In step S100, the driving force command F_ENG of the engine E is calculated by subtracting, from the required driving force F_REQ, the front motor/generator driving force command F_FrMot and the rear motor/generator driving force command F_RrMot. That is, the total required driving force of the engine E, the front motor/generator MG1, and the rear motor/generator MG2 is made to coincide with the required driving force F_REQ.

A subroutine of the 'electric mode processing' of step S31 of the flow chart of FIG. 3 is now explained with reference to the flow chart of FIG. 8.

Figure 8:
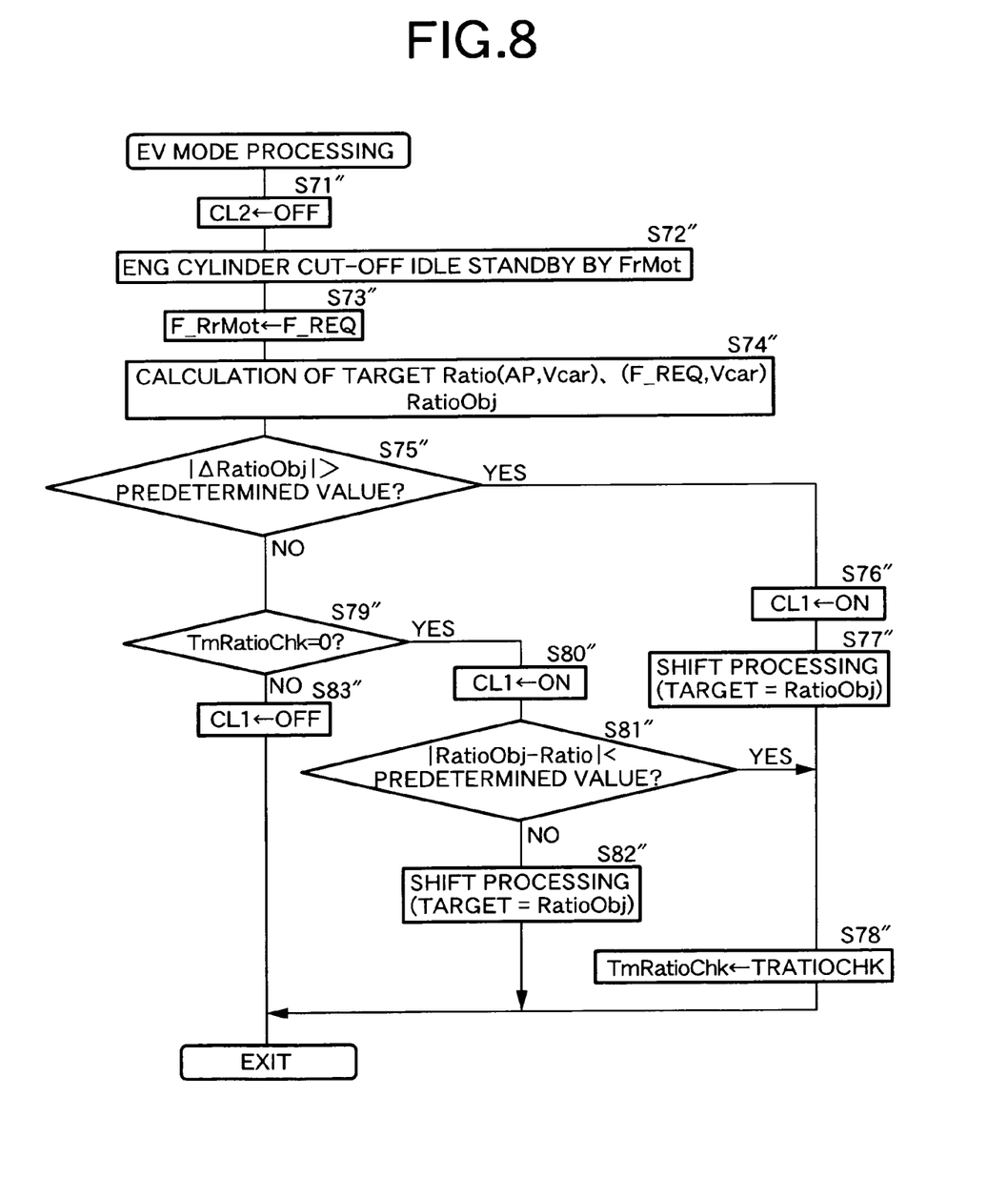
FIG. 8 is a flow chart of an electric mode processing routine.

The flow chart of FIG. 8 is substantially the same as that of FIG. 5; when the vehicle travels electrically, in the same manner as when the vehicle creeps electrically, the first clutch 14 is engaged under predetermined conditions so as to rotate the drive pulley 16 and the driven pulley 18 of the belt type continuously variable transmission M, and shifting to the target ratio RatioObj is carried out while checking the actual ratio Ratio; it is therefore possible to reliably prevent a delay in response of shifting of the belt type continuously variable transmission M. The only difference is that, in step S73 of the flow chart of FIG. 5 the required driving force F_REQ of the rear motor/generator MG2 is a small value for electric creep traveling, but in step S73" of the flow chart of FIG. 8, the required driving force F_REQ of the rear motor/generator MG2 is a large value for electrical traveling.

Figure 9:
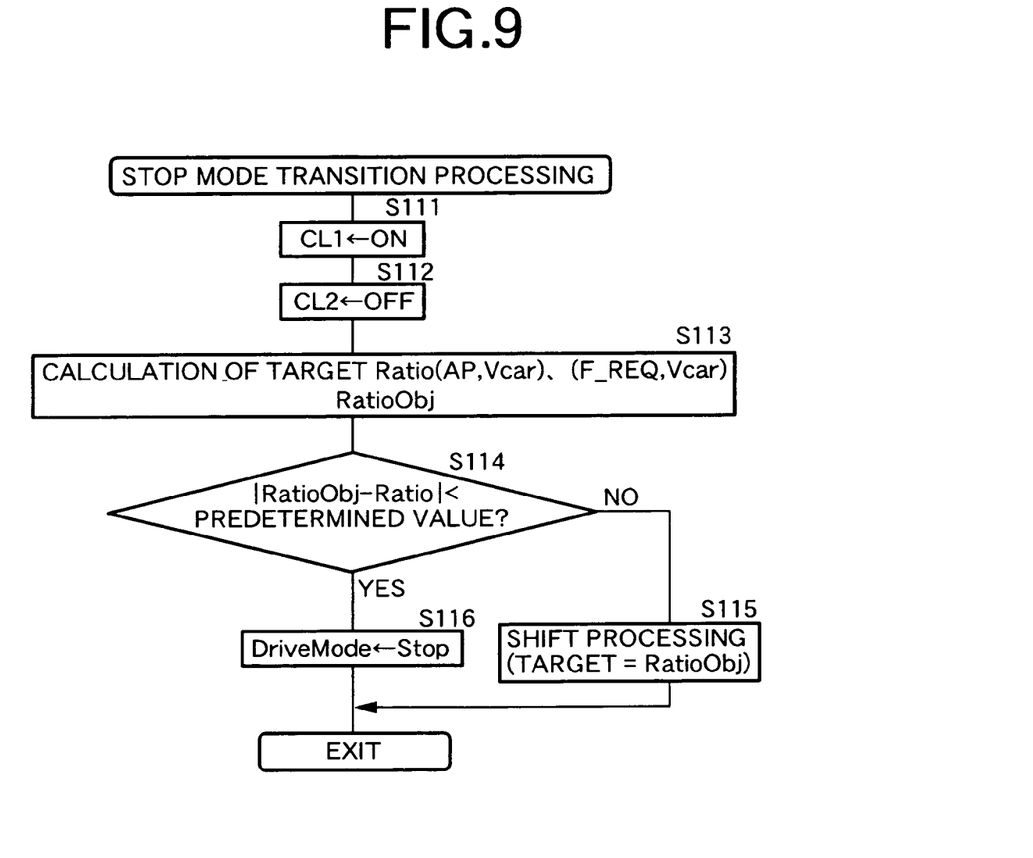
FIG. 9 is a flow chart of a stop mode transition processing routine.

The subroutine of the 'stop mode transition processing' of step S33 of the flow chart of FIG. 3 is explained with reference to the flow chart of FIG. 9.

Firstly, in step S111 the first clutch 14 is engaged, in step S112 the second clutch 20 is disengaged, and in step S113 the target ratio RatioObj of the belt type continuously variable transmission M is calculated from the accelerator pedal degree of opening AP and the vehicle speed Vcar, or the required driving force F_REQ and the vehicle speed Vcar. If in step S114 the deviation |RatioObj−Ratio| of the actual ratio Ratio from the target ratio RatioObj is not less than a predetermined value, that is, the deviation |RatioObj−Ratio| is large, then in step S115 shift processing is carried out so that the actual ratio Ratio of the belt type continuously variable transmission M coincides with the target ratio RatioObj. On the other hand, if in step S114 the deviation |RatioObj−Ratio| is less than the predetermined value, then the drive mode DriveMode is set at the stop mode Stop. In this way, in a state in which the second clutch 20 is disengaged and the first clutch 14 is engaged, after the actual ratio Ratio of the belt type continuously variable transmission M is made to coincide with the target RatioObj, a transition to the 'stop mode' is carried out.

Figure 10:
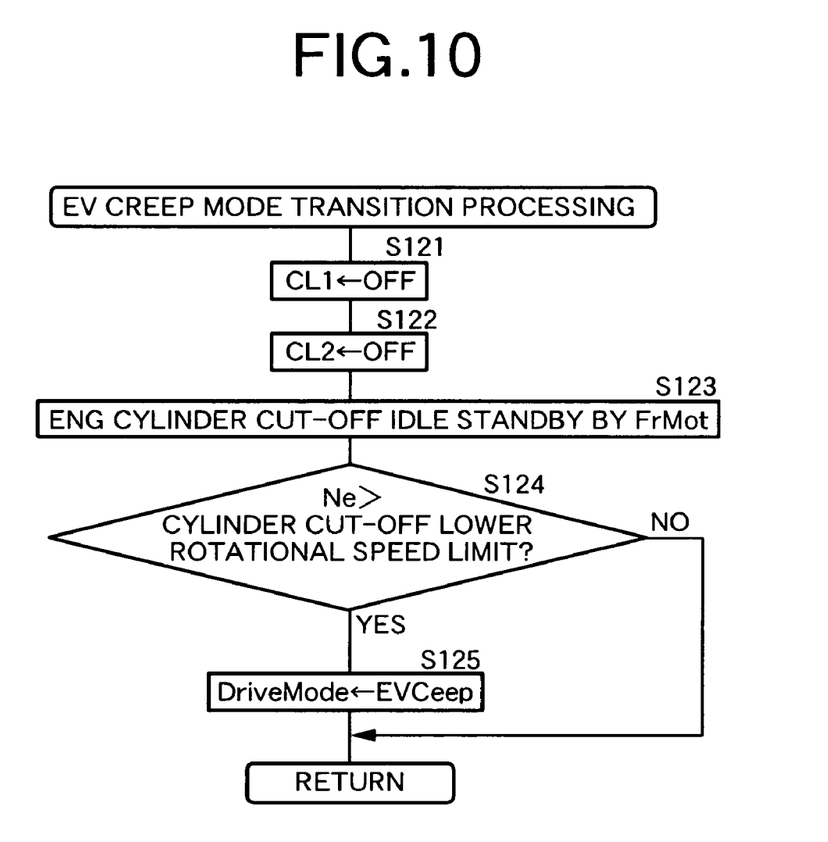
FIG. 10 is a flow chart of an electric creep mode transition processing routine.

A subroutine of the 'electric creep mode transition processing' of step S35 of the flow chart of FIG. 3 is explained with reference to the flow chart of FIG. 10.

Firstly, in step S121 the first clutch 14 is disengaged, in step S112 the second clutch 20 is disengaged, and in step S123 the front motor/generator MG1 is driven as a motor so as to make the engine E idle in a cylinder cut-off state, thereby generating a hydraulic pressure for shifting the belt type continuously variable transmission M by driving the oil pump 13 while minimizing the pumping loss of the engine E. If in the subsequent step S124 the engine rotational speed Ne exceeds a cylinder cut-off lower rotational speed limit, or if the hydraulic pressure generated by the oil pump 13 exceeds a cylinder cut-off lower hydraulic pressure limit, then in step S125 the drive mode DriveMode is set at the electric creep mode EVCeep.

Figure 11:
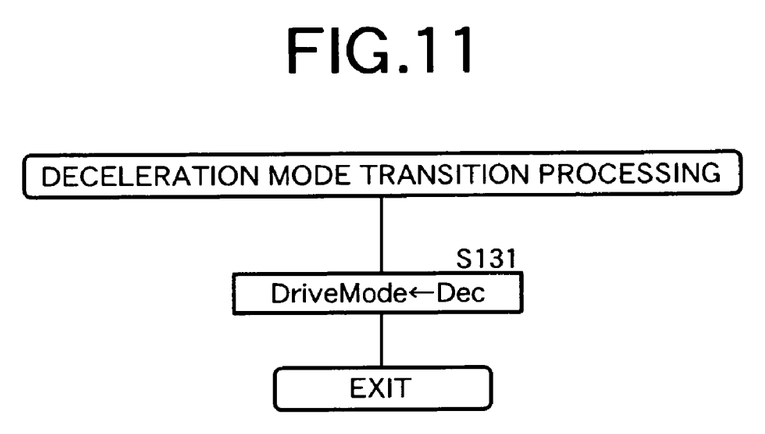
FIG. 11 is a flow chart of a deceleration mode transition processing routine.

A subroutine of the 'deceleration mode transition processing' of step S37 of the flow chart of FIG. 3 is explained with reference to the flow chart of FIG. 11.

In step S131 the drive mode DriveMode is set at the deceleration mode Dec.

Figure 12:
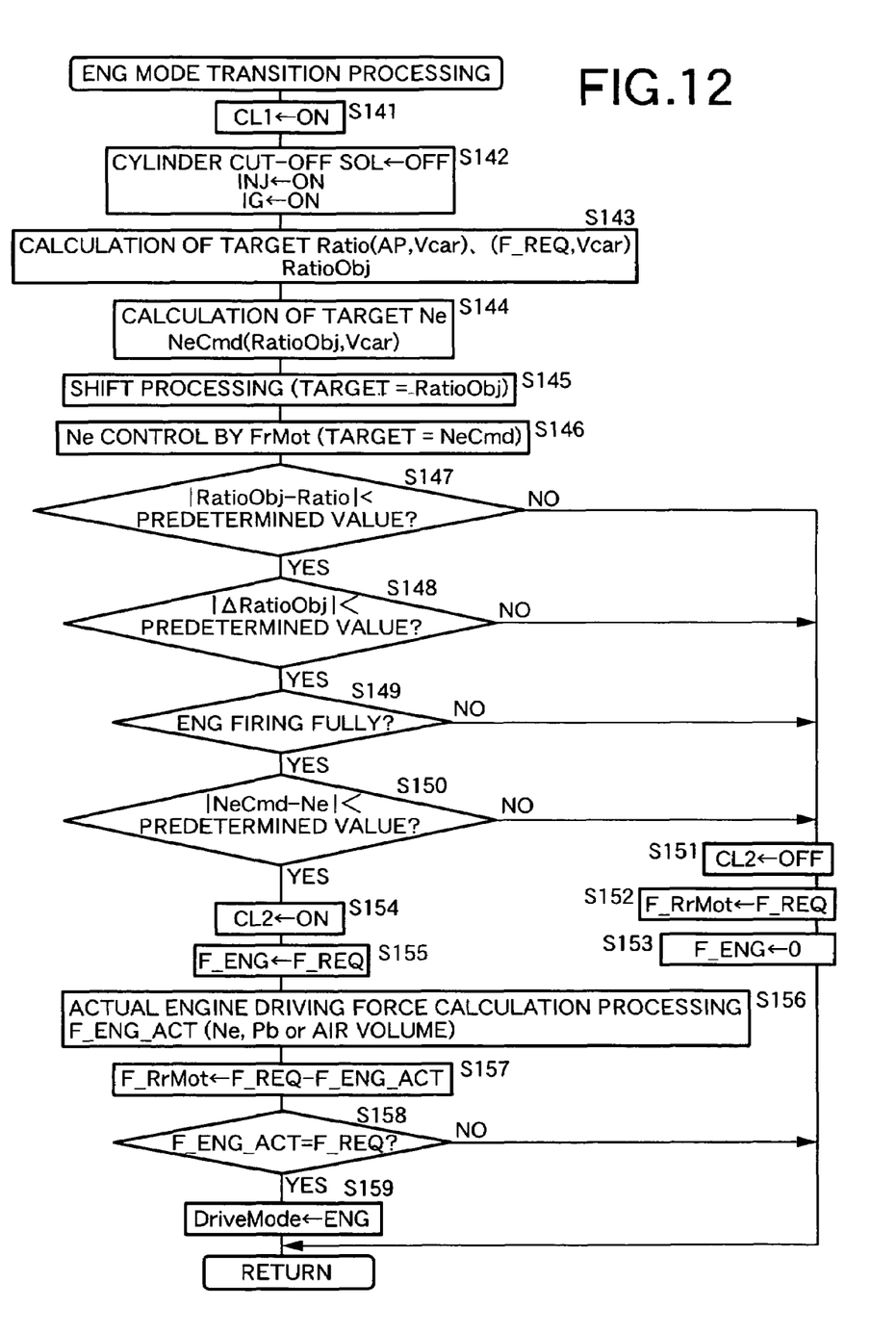
FIG. 12 is a flow chart of an engine mode transition processing routine.

A subroutine of the 'engine mode transition processing' of step S39 of the flow chart of FIG. 3 is explained with reference to the flow chart of FIG. 12.

Firstly in step S141 the first clutch 14 is engaged, then in step S142 a cylinder cut-off solenoid is turned OFF so as to cancel the cylinder cut-off state of the engine E, a fuel injection permission INJ is turned ON, and an ignition permission IG is turned ON. In the subsequent step S143, the target ratio RatioObj of the belt type continuously variable transmission M is calculated from the accelerator pedal degree of opening AP and the vehicle speed Vcar, or from the required driving force F_REQ and the vehicle speed Vcar, and in step S144 a target engine rotational speed NeCmd is calculated from the target ratio RatioObj and the vehicle speed Vcar. Subsequently, in step S145 shift processing is carried out so that the actual ratio Ratio of the belt type continuously variable transmission M coincides with the target ratio RatioObj, and in step S146 the front motor/generator MG1 is operated as a motor or a generator so that the engine rotational speed Ne coincides with the target engine rotational speed NeCmd.

If in the subsequent step S147 the deviation |RatioObj−Ratio| of the actual ratio Ratio from the target ratio RatioObj is not less than a predetermined value, that is, if the deviation |RatioObj−Ratio| is large, or if in step S148 the percentage target ratio change |ΔRatioObj| is not less than a predetermined value, that is, the percentage target ratio change |ΔRatioObj| is large, or if in step S149 the engine E is not firing fully, or if in step S150 if the deviation |NeCmd−Ne| of the engine rotational speed Ne from the target engine rotational speed NeCmd is not less than a predetermined value, that is, the deviation |NeCmd−Ne| is large, then in step S151 the second clutch 20 is disengaged, in step S152 the rear motor/generator driving force command F_RrMot is set at the required driving force F_REQ, and in step S153 the engine driving force command F_ENG is set at 0.

Here, a throttle valve should be opened by an amount corresponding to a no-load state of the engine E, which depends on the engine rotational speed Ne. The purpose of the throttle valve being opened by the amount corresponding to the no-load state is to make the output torque of the crankshaft 11 equal to 0, that is, the engine E is made to carry out work corresponding to its friction. In this way, the rear motor/generator MG2 is made to generate a driving force until the target ratio RatioObj and the target engine rotational speed NeCmd are achieved.

If the answers in steps S147 to S150 are all YES, that is, if traveling by means of the engine E is possible, then in step S154 the second clutch 20 is engaged (including the so-called half-clutch), and in step S155 the engine driving force command F_ENG is set at the required driving force F_REQ. In the subsequent step S156 the actual engine driving force F_ENG_ACT is calculated from the engine rotational speed Ne and an intake negative pressure Pb (or an intake air volume), and in step S157 the rear motor/generator driving force command F_RrMot is set at the required driving force F_REQ—the actual engine driving force F_ENG_ACT. If in the subsequent step S158 the actual engine driving force F_ENG_ACT coincides with the required driving force F_REQ, that is, the rear motor/generator MG2 stops and only the engine E generates a driving force, then in step S159 the drive mode DriveMode is set at the engine mode ENG.

Figure 13:
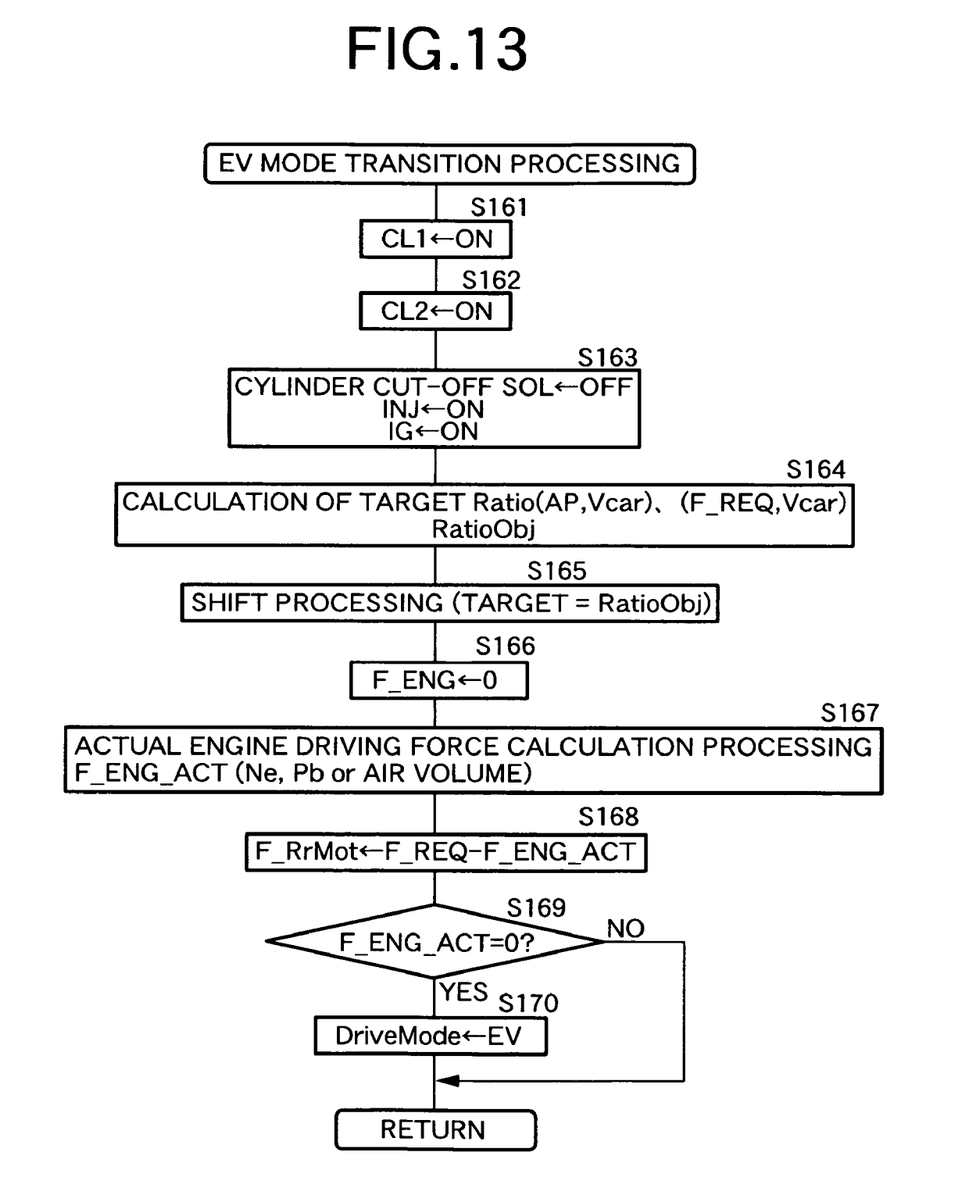
FIG. 13 is a flow chart of an electric mode transition processing routine.

A subroutine of the 'electric mode transition processing' of step S41 of the flow chart of FIG. 3 is now explained with reference to the flow chart of FIG. 13.

Firstly in step S161 the first clutch 14 is engaged, in step S162 the second clutch 20 is engaged, then in step S163 the cylinder cut-off solenoid is turned OFF so as to cancel the cylinder cut-off state of the engine E, the fuel injection permission INJ is turned ON, and the ignition permission IG is turned ON. In the subsequent step S164, the target ratio RatioObj of the belt type continuously variable transmission M is calculated from the accelerator pedal degree of opening AP and the vehicle speed Vcar, or the required driving force F_REQ and the vehicle speed Vcar, in step S165 shift processing is carried out so that the actual ratio Ratio of the belt type continuously variable transmission M coincides with the target ratio RatioObj, and in step S166 the engine driving force command F_REQ is set at 0 (no-load throttle degree of opening).

In the subsequent step S167, the actual engine driving force F_ENG_ACT is calculated from the engine rotational speed Ne and the intake negative pressure Pb (or an intake air volume), and in step S168 the rear motor/generator driving force command F_RrMot is set at the required driving force F_REQ—the actual engine driving force F_ENG_ACT. In the subsequent step S169 if the actual engine driving force F_ENG_ACT is 0, that is, the rear motor/generator MG2 generates all of the required driving force F_REQ, then in step S170 the drive mode DriveMode is set at the electric mode EV.

As hereinbefore described, in accordance with the present embodiment, when the vehicle travels while the operation of the engine E is stopped and the rear wheels Wr are driven or braked by the rear motor/generator MG2, that is, in the 'electric creep mode' of FIG. 5, the 'deceleration mode' of FIG. 6, and the 'electric mode' of FIG. 8, the oil pump 13 is driven by the front motor/generator MG1 in a state in which the pumping loss of the engine E is reduced by the pumping loss reduction means maintaining the intake valve of the engine E in a valve closed state and the second clutch 20 is disengaged. It is therefore possible to shift the belt type continuously variable transmission M by means of the hydraulic pressure generated by the oil pump 13 even when the engine E is stopped, and it is possible to prevent shift shock from occurring by controlling the actual ratio of the belt type continuously variable transmission M at a target ratio with good responsiveness when the engine is started and the front wheels Wf are driven via the belt type continuously variable transmission M.

Here, since the engine E rotated by the front motor/generator MG1 is in a state in which the pumping loss is reduced, and the front motor/generator MG1 is disconnected from the front wheels Wf by the second clutch 20 being disengaged, it is possible to minimize the power consumption by reducing the load of the front motor/generator MG1. Furthermore, by disengaging the first clutch 14 when the front motor/generator MG1 is driven, it is possible to prevent drag on the belt type continuously variable transmission M, thus reducing the power consumption of the front motor/generator MG1. Moreover, since the engine E is made to idle by the front motor/generator MG1, the engine E can be started rapidly by controlling the ignition and starting to supply fuel, and it is possible to smoothly and rapidly transfer from a state of traveling by means of the rear motor/generator MG2 to a state of traveling by means of the engine E.

Furthermore, when the vehicle travels by means of the rear motor/generator MG2 while the engine E is stopped, since the belt type continuously variable transmission M is shifted by intermittently engaging the first clutch 14 when the deviation |RatioObj−Ratio| of the actual ratio from the target ratio of the belt type continuously variable transmission M exceeds a predetermined value, compared with a case in which shifting is carried out by continuously engaging the first clutch 14 while the engine E is stopped, it is possible to reduce the power consumption by minimizing the time for which the belt type continuously variable transmission M is driven by the front motor/generator MG1. Moreover, since shifting is carried out by continuously engaging the first clutch 14 when the percentage target ratio change |ΔRatioObj| of the belt type continuously variable transmission M exceeds a predetermined value, when it is necessary to rapidly shift the belt type continuously variable transmission M, it can be shifted without delay.

Although an embodiment of the present invention is explained above, the present invention can be modified in a variety of ways without departing from the scope and spirit thereof.

For example, in the embodiment, the belt type continuously variable transmission M is illustrated as the automatic transmission, but the present invention can also be applied to a continuously variable transmission other than the belt type continuously variable transmission or to a stepped automatic transmission.

Furthermore, instead of the damper 12, a torque converter may be provided.

Moreover, the pumping loss reduction means is not limited to the embodiment, and may employ means in which both an intake valve and an exhaust valve are fully closed, or a throttle valve is fully opened.

Furthermore, with regard to the drive mode of the vehicle V, other than those described in the embodiment, there can be considered a mode in which the driving force of the engine E is assisted by one or both of the first and second motor/generators MG1 and MG2, or a mode in which, without using the engine E, the vehicle travels by means of the driving force of both of the first and second motor/generators MG1 and MG2.

The invention claimed is:

1. A hybrid vehicle in which an engine (E) equipped with pumping loss reduction means is connected to a first driven wheel via a first motor/generator (MG1), an oil pump (13), a first clutch (14), a hydraulic automatic transmission (M), and a second clutch (20), and a second motor/generator (MG2) is connected to a second driven wheel (Wr), the second driven wheel (Wr) being different from the first driven wheel (Wf), characterized in that when the vehicle is made to travel by driving or braking the second driven wheel (Wr) with the second motor/generator (MG2), in order to shift the automatic transmission (M) a hydraulic pressure is generated by driving the oil pump (13) with the first motor/generator (MG1) in a state in which the pumping loss of the engine (E), which has stopped running, is reduced by the pumping loss reduction means and the second clutch (20) is disengaged.

2. The hybrid vehicle according to claim 1 wherein, when a deviation of the actual ratio of the automatic transmission (M) from a target ratio exceeds a predetermined value, the automatic transmission (M) is shifted while intermittently engaging the first clutch (14).

3. The hybrid vehicle according to claim 1 wherein, when the percentage change of a target ratio of the automatic transmission (M) exceeds a predetermined value, the automatic transmission (M) is shifted while continuously engaging the first clutch (14).

4. The hybrid vehicle according to claim 1 wherein, when the remaining capacity of a battery (28) connected to the first and second motor/generators (MG1, MG2) exceeds a predetermined value, the required driving force of the vehicle is less than a predetermined value, and the pumping loss of the engine (E) can be reduced, traveling by means of the second motor/generator (MG2) is permitted.

5. The hybrid vehicle according to claim 4 wherein, when the pumping loss reduction means is operated and traveling is carried out by means of the second motor/generator (MG2), a hydraulic pressure for shifting the automatic transmission (M) is generated by driving the oil pump (13) with the first motor/generator (MG1).

6. The hybrid vehicle according to claim 1 wherein, when a hydraulic pressure is generated in order to shift the automatic transmission (M) by driving the oil pump (13) with the first motor/generator (MG1), the first clutch (14) is disengaged.

\* \* \* \* \*